United States Patent
Lee et al.

(10) Patent No.: US 8,451,861 B2
(45) Date of Patent: May 28, 2013

(54) METHOD FOR REQUESTING BANDWIDTH ALLOCATION AND DETECTING SERVICE FLOW IN COMMUNICATION SYSTEM

(75) Inventors: Ok-Seon Lee, Suwon-si (KR);
Geun-Hwi Lim, Seongnam-si (KR);
Jae-Jeong Shim, Seongnam-si (KR);
Jong-Hyung Kwun, Seongnam-si (KR);
Yeong-Moon Son, Yongin-si (KR);
Jung-Hoon Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 12/203,065

(22) Filed: Sep. 2, 2008

(65) Prior Publication Data
US 2009/0069024 A1 Mar. 12, 2009

(30) Foreign Application Priority Data

Sep. 12, 2007 (KR) .............................. 2007-0092546
Dec. 24, 2007 (KR) .............................. 2007-0136686

(51) Int. Cl.
*H04J 3/22* (2006.01)
(52) U.S. Cl.
USPC ........................................................ 370/468
(58) Field of Classification Search
None
See application file for complete search history.

(56) References Cited

U.S. PATENT DOCUMENTS

| 6,687,225 | B1 * | 2/2004 | Kawarai et al. ............ 370/230.1 |
| 2006/0203712 | A1 | 9/2006 | Lim et al. |
| 2007/0206545 | A1 | 9/2007 | Lee et al. |
| 2007/0253421 | A1 * | 11/2007 | Cai ................................ 370/394 |
| 2008/0101376 | A1 | 5/2008 | Do et al. |
| 2009/0069024 | A1 * | 3/2009 | Lee et al. ...................... 455/450 |
| 2010/0144360 | A1 * | 6/2010 | Okuda .......................... 455/450 |

OTHER PUBLICATIONS

IEEE Std 802.16e-2005 and IEEE Std 802.16/2004/Cor-2005 (Amendment and Corrigendum to IEEE std. 802.16-2004), IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1, Feb. 28, 2006, New York.

* cited by examiner

*Primary Examiner* — Andrew Lai
*Assistant Examiner* — Leon Andrews
(74) *Attorney, Agent, or Firm* — Jefferson IP Law, LLP (57) ABSTRACT

A method for requesting bandwidth allocation by a mobile station in a communication system is provided. The mobile station detects at least one Connection IDentifier (CID), bandwidth allocation for which is to be requested, generates a bandwidth request header when the number of the at least one detected CID equals one, and transmits the bandwidth request header to a base station, wherein the bandwidth request header includes a region for indicating a first CID representing basic information for identification of the mobile station, a region for indicating a ranking of the detected CID, and a region for indicating information about bandwidth requested for the detected CID.

13 Claims, 8 Drawing Sheets

FIG.1
(CONVENTIONAL ART)

| HT=1 (1) (101) | EC=0 (1) (103) | Type (3) (105) | BR MSB (11) (107) |
| BR LSB (8) (109) | | CID MSB (8) (111) | |
| CID LSB (8) (113) | | HCS (8) (115) | |

| HT=1 (1) (201) | EC=1 (1) (203) | Type=1 (1) (205) | private CID index (n) (207) | BR MSB (13-n) (209) |
| BR LSB (8) (211) | | Basic CID MSB (8) (213) | |
| Basic CID LSB (8) (215) | | HCS (8) (217) | |

| HT=1 (1) (401) | EC=1 (1) (403) | Type=1(1) (405) | Sub-type=1 (1) (407) | private CID index (n) (409) | BR MSB (12-n) (411) |
|---|---|---|---|---|---|
| | | | | BR LSB (8) (413) | Basic CID MSB (8) (415) |
| | | | | Basic CID LSB (8) (417) | HCS (8) (419) |

FIG.4

| HT=1 (1) (501) | EC=1 (1) (503) | Type=1(1) (505) | Sub-type=0 (1) (507) | BR CID MAP (n) (509) | BR MSB (12-n) (511) |
|---|---|---|---|---|---|
| | | | | BR LSB (8) (513) | Basic CID MSB (8) (515) |
| | | | | Basic CID LSB (8) (517) | HCS (8) (519) |

| HT=0 (1) (701) | EC=1 (703) | Type (6) (705) | ESF (1) (707) | CI (1) (709) | EKS (2) (711) | Rsvd (1) (713) | LEN MSB (3) (715) |
|---|---|---|---|---|---|---|---|
| LEN LSB (8) (717) ||||| CID MSB (8) (719) |||
| CID LSB (8) (721) ||||| HCS (8) (723) |||

FIG.10

METHOD FOR REQUESTING BANDWIDTH ALLOCATION AND DETECTING SERVICE FLOW IN COMMUNICATION SYSTEM

PRIORITY

This application claims the benefit under 35 U.S.C. §119(a) of a Korean patent application filed with the Korean Intellectual Property Office on Sep. 12, 2007 and assigned Serial No. 2007-92546, and of a Korean patent application filed with the Korean Intellectual Property Office on Dec. 24, 2007 and assigned Serial No. 2007-136686, the entire disclosures of both of which are hereby incorporated by reference.

BACKGROUND OF THE INVENTION

1. Field of the Invention:

The present invention relates to a communication system. More particularly, the present invention relates to a method for requesting UpLink (UL) bandwidth allocation by a Mobile Station (MS), and allocating the uplink bandwidth by a Base Station (BS) in a communication system.

2. Description of the Related Art:

In a wireless communication system, there are a limited number of resources that can be used to support communication between users. For this reason, research is being actively conducted to find new or improved ways to ensure the efficient use of the limited resources. For efficient use of limited resources, it is necessary to prevent resources from being unnecessarily allocated, to rapidly collect allocated resources, and to re-allocate the collected resources for a different service.

When a bandwidth allocation is received from a Mobile Station (MS) through an uplink bandwidth allocation request, a Base Station (BS) should rapidly allocate the bandwidth. An uplink bandwidth allocation request is performed for each Connection IDentifier (CID) of an MS, and the bandwidth allocation by the BS is performed for each MS. That is, an MS requests allocation of a bandwidth required according to each CID, and a BS collects bandwidths requested according to each CID and allocates bandwidths according to each MS. A polling scheme, which is a representative scheme for requesting uplink bandwidth allocation by an MS, will now be described.

The polling scheme is used to request bandwidth allocation by transmitting a 6-byte bandwidth request header, in which information about an uplink bandwidth required for a corresponding CID is recorded, at a preset polling interval according to each CID of the MSs. The information about a bandwidth may be, for example, the amount of bandwidth. The polling scheme is used for service that requires bandwidths of various sizes during a certain interval, or for service that requires bandwidths of various sizes during various intervals.

Figure 1:
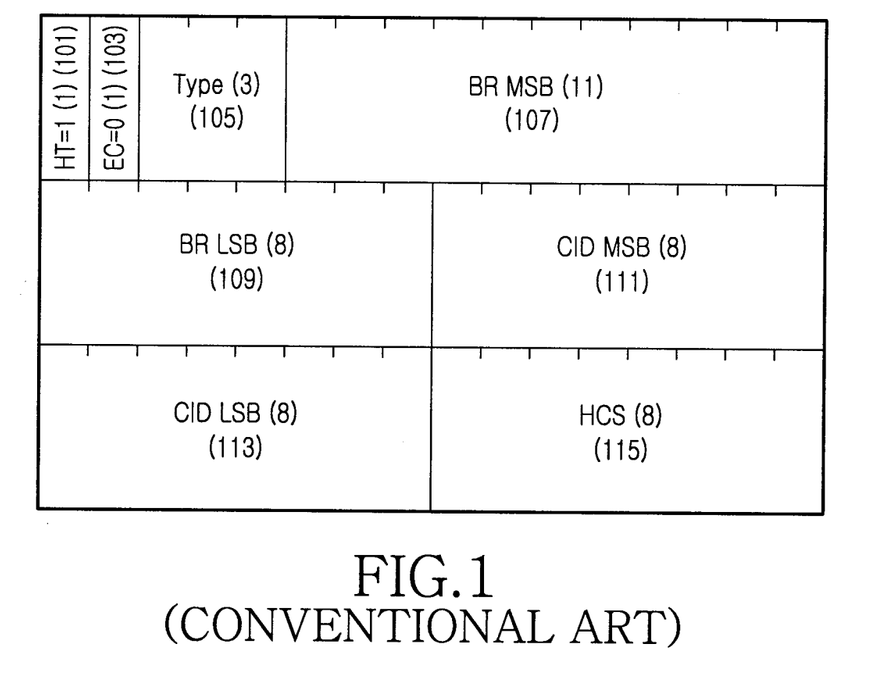
FIG. 1 is a view illustrating the format of a conventional uplink bandwidth request header.

FIG. 1 is a view illustrating the format of a conventional uplink bandwidth request header.

The uplink bandwidth request header includes a Header Type (HT) field 101, an EnCoding (EC) field 103, a type field 105, a Bandwidth Request (BR) field 107 and 109, a CID field 111 and 113, and a Header Check Sequence (HCS) field 115.

An MS can request bandwidth allocation by recording a CID, i.e. a Transport CID, which requests bandwidth allocation, in the CID field 111 and 113 of the uplink bandwidth request header shown in FIG. 1, and then transmits the uplink bandwidth request header to a BS. The Transport CID is allocated in one-to-one correspondence with a service flow of the BS, which manages the MS, and the Transport CID is unique only to the BS.

Due to the characteristic of the Transport CID which is unique only to the BS, when the MS moves from a coverage area of a BS (e.g. a serving BS), which is currently managing the MS, to a coverage area of a BS (e.g. a target BS) other than the serving BS, through a handover or the like, the Transport CID of the MS collides with a Transport CID allocated to MSs in the area covered by the target BS. In order to avoid such a collision, when an MS moves into the coverage area of the target BS, the target BS performs a separate CID update operation to allocate a new Transport CID to the MS.

As described above, since the Transport CID is unique only to a corresponding BS, when an MS having a Transport CID is handed over from the current serving BS to a target BS, the target BS must perform a CID update operation for the MS. Therefore, there is a problem in that resources are wasted due to a CID update that must be performed whenever a handover is performed.

SUMMARY OF THE INVENTION

An aspect of the present invention is to address at least the above-mentioned problems and/or disadvantages and to provide at least the advantages described below. Accordingly, an aspect of the present invention is to provide a method for requesting bandwidth allocation by a mobile station, and allocating bandwidth by a base station according to the request of the mobile station so that waste of resources due to a CID update can be prevented in a communication system.

Another aspect of the present invention is to provide a method for requesting bandwidth allocation for a plurality of CIDs at the same time, and allocating bandwidth by a base station according to the request of the mobile station in a communication system.

In accordance with an aspect of the present invention, a method for requesting bandwidth allocation by a mobile station in a communication system is provided. The method includes detecting at least one CID, bandwidth allocation for which is to be requested, when the number of the at least one detected CID equals one, generating a bandwidth request header, which includes a region for indicating a first CID representing basic information for identification of the mobile station, a region for indicating a ranking of the detected CID, and a region for indicating information about bandwidth requested for the detected CID and transmitting the bandwidth request header to a base station.

In accordance with another aspect of the present invention, a method for requesting bandwidth allocation by a mobile station in a communication system is provided. The method includes detecting at least one CID, bandwidth allocation for which is to be requested, when the detected at least one CID comprises a plurality of CIDs, generating a bandwidth request header, which includes a subtype region for indicating that the detected CID is plural in number, a region for indicating a basic CID for identification of the mobile station, a region for indicating a bitmap that represents the detected CIDs in a list in which CIDs of the mobile station are arranged according to a rule, and a region for indicating information about bandwidth requested for the detected CIDs and transmitting the bandwidth request header to a base station.

In accordance with still another aspect of the present invention, a method for detecting a service flow, to which a MAC header and a MAC PDU concatenated with the MAC header belong, in a communication system is provided. The method includes receiving a message, which includes a MAC header, an extended subheader group length field, an extended subheader type field, and an extended subheader body field corresponding to the extended subheader type field, wherein a private CID index is indicated in the extended subheader body field and detecting a service flow, to which the MAC header and a MAC PDU concatenated with the MAC header belong, according to the private CID index indicated in the extended subheader body field of the message, wherein a private CID indicated by the private CID index is allocated such that a mobile station is uniquely identified in the communication system.

In accordance with yet another aspect of the present invention, a method for detecting a service flow, to which a MAC header and a MAC PDU concatenated with the MAC header belong, in a communication system is provided. The method includes receiving a message including a MAC header and a private CID field, wherein a private CID index, to which the MAC header and a MAC PDU concatenated with the MAC header belong, is indicated and detecting a service flow, to which the MAC header and a MAC PDU concatenated with the MAC header belong, according to the private CID index indicated in the private CID field of the message, wherein a private CID indicated by the private CID index is allocated such that a mobile station is uniquely identified in the communication system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a method in which a Mobile Station (MS) requests bandwidth allocation by a combination of a basic Connection IDentifier (CID) and a private CID, and a Base Station (BS) allocates a bandwidth according to the request of the MS in a communication system. Here, the basic CID represents a CID for distinguishing each MS from the others, and the private CID represents a CID newly proposed by exemplary embodiments of the present invention.

Also, exemplary embodiments of the present invention propose a method in which an MS requests bandwidth allocation for a plurality of CIDs at the same time, and a BS allocates a bandwidth according to the request of the mobile station in a communication system.

In addition, exemplary embodiments of the present invention propose a method in which an MS and a BS detect a service flow according to use of a private CID.

The private CID newly proposed by exemplary embodiments of the present invention will now be described.

The private CID is unique only in each MS so that the same CID can be allocated even though different service flows, according to a communication service provision between a BS and an MS, are used. Therefore, although an MS having such a private CID moves from the coverage area of the current serving BS to the coverage area of a target BS through a handover or the like, the pre-allocated private CID can be continuously used, so that the target BS has no need to perform a separate CID update for allocating a new CID.

Figure 2:
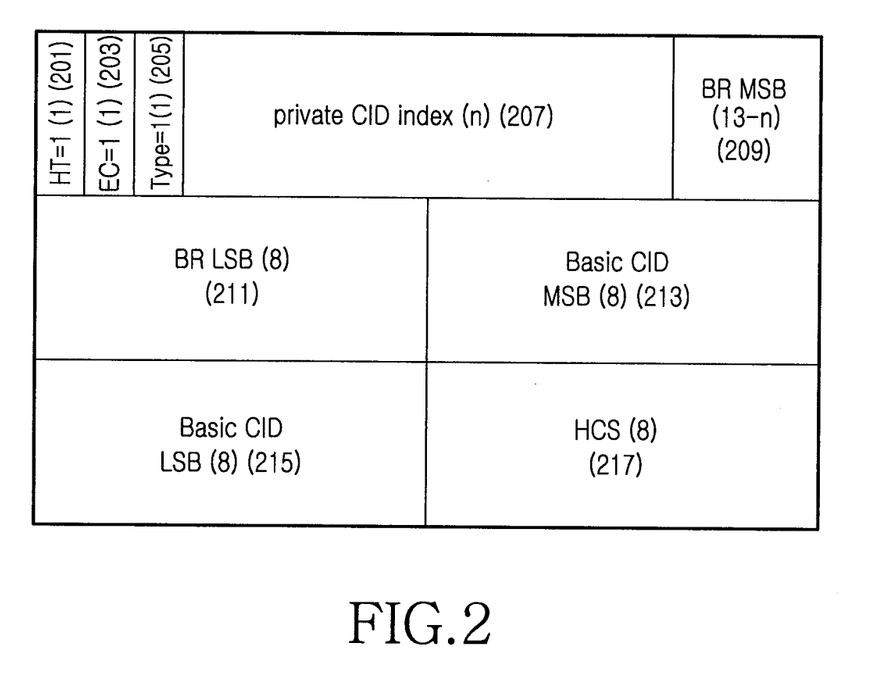
FIG. 2 is a view illustrating the format of an uplink bandwidth request header in a communication system according to an exemplary embodiment of the present invention.
Figure 4:
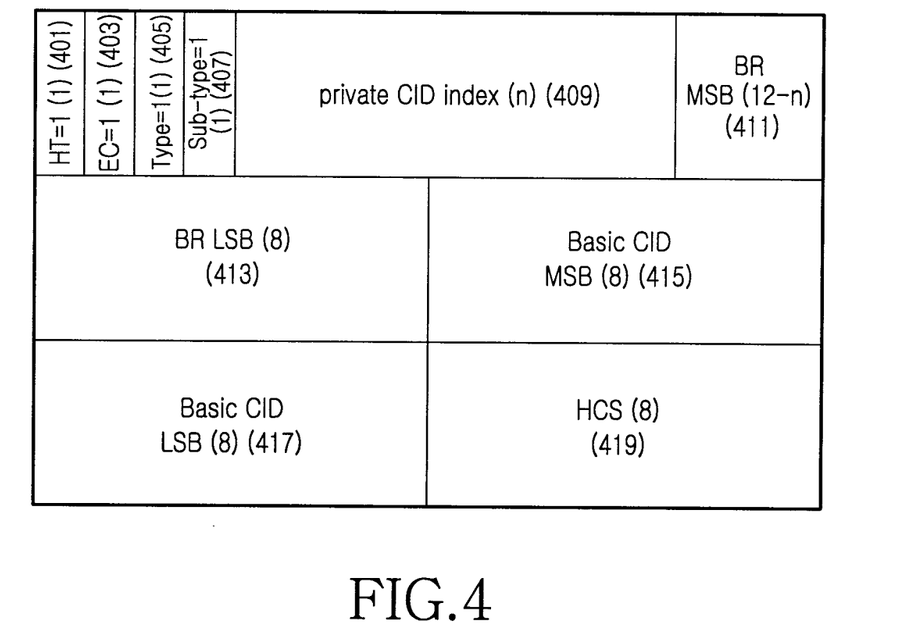
FIG. 4 is a view illustrating the format of an uplink bandwidth request header in a communication system according to an exemplary embodiment of the present invention.
Figure 5:
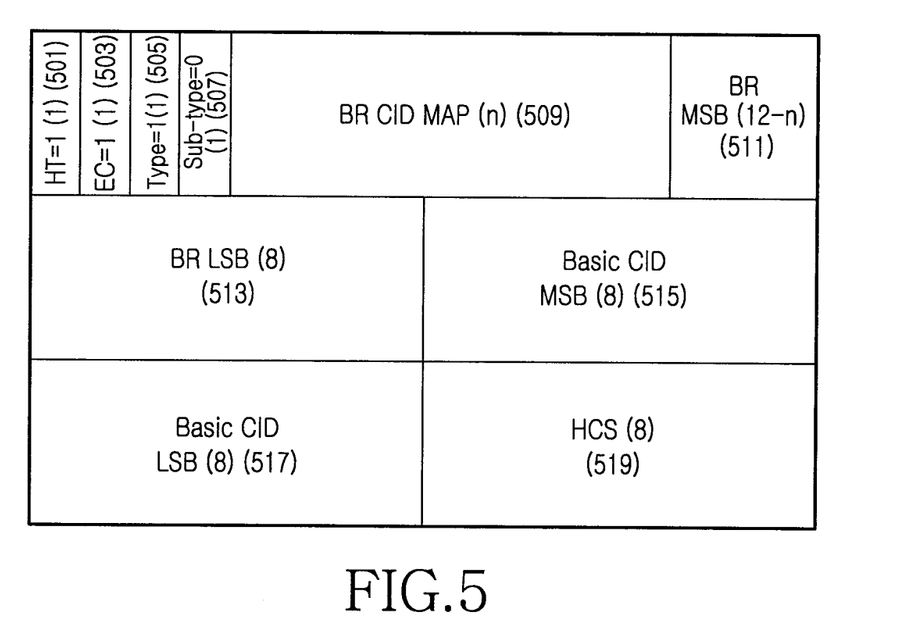
FIG. 5 is a view illustrating the format of an uplink bandwidth request header in a communication system according to an exemplary embodiment of the present invention.

Hereinafter, the format of an uplink bandwidth request header used in a communication system according to an exemplary embodiment of the present invention will be described with reference to FIGS. 2, 4, and 5. FIGS. 2, 4, and 5 illustrate uplink bandwidth request headers which are formed by borrowing and using a reserved field for a type field value of 1 (i.e. Type=1) within a type II format of a Media Access Control (MAC) signaling header proposed in the Institute of Electrical and Electronics Engineers (IEEE) 802.16 standard. However, the uplink bandwidth request header proposed by exemplary embodiments of the present invention can be formed by borrowing and using any reserved field.

FIG. 2 is a view illustrating the format of an uplink bandwidth request header in a communication system according to an exemplary embodiment of the present invention.

The uplink bandwidth request header shown in FIG. 2 is used when there is one service flow for which to request bandwidth allocation, and includes a Header Type (HT) field 201, an EnCoding (EC) field 203, a Type field 205, a private CID index field 207, a Bandwidth Request (BR) field 209 and 211, a basic CID field 213 and 215, and a Header Check Sequence (HCS) field 217.

An MS requests bandwidth allocation by transmitting the uplink bandwidth request header shown in FIG. 2 to a BS.

When receiving the uplink bandwidth request header, the BS evaluates the private CID index field 207 and the basic CID field 213 and 215 in the uplink bandwidth request header, and detects a service flow, a bandwidth allocation for which has been requested from the MS. Then, for the detected service flow, the BS allocates the MS bandwidth according to the bandwidth amount information recorded in the bandwidth request field 209 and 211.

Meanwhile, the private CID index field 207 is defined to have a size of "n" bits, and the BR field 209 is defined to have a size of "13-n" bits, wherein the "n" is determined by equation 1 below.

$$n=\min(M,m) \quad (1)$$

In equation 1, "M" represents a value that varies depending on the minimum value of the size of the bandwidth request field 209 and 211. For example, in the IEEE 802.16 standard, since the bandwidth request field 209 and 211 uses a minimum of 11 bits, "M" may have a value of "10." Also, "m" represents a minimum value among integers that satisfy a condition that "$2^m \geq k$," wherein "k" represents a total number of CIDs possessed by an MS corresponding to a basic CID. For example, when it is assumed that an MS possesses a total of 12 CIDs, k=12, m=4, and n=4, so that the size of the private CID index field 207 is determined to be 4 bits, and the size of the bandwidth request field 209 is determined to be 9 bits.

Figure 3:
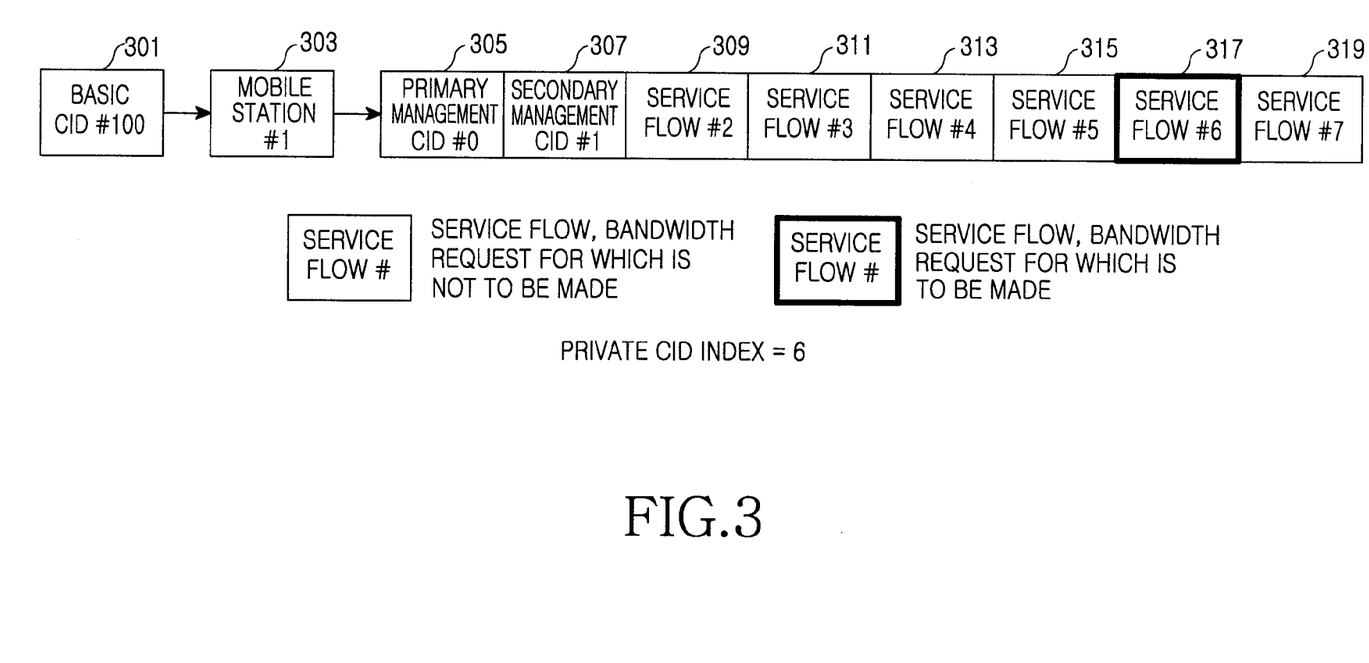
FIG. 3 is a view illustrating an operation of determining a value recorded in a private CID index field according to an exemplary embodiment of the present invention.

FIG. 3 is a view illustrating an operation of determining a value recorded in the private CID index field 207 according to an exemplary embodiment of the present invention.

Mobile station #1 303, corresponding to basic CID #100 301, includes primary management CID #0 305, secondary management CID #1 307, and service flow #2 309 to service flow #7 319, wherein it is assumed that different service flows are allocated different private CIDs.

When it is assumed that the MS #1 303 requests bandwidth allocation for service flow #6 317 from among the service flows which the MS #1 303 possesses, the MS #1 303 first detects the ranking of the service flow #6 317 from a list, in which the primary management CID #0 305, the secondary management CID #1 307, and the service flows are arranged according to a rule. Then, the MS #1 303 records the detected ranking in the private CID index field 207 of the uplink bandwidth request header, and transmits the uplink bandwidth request header to a BS. In this case, the value recorded in the private CID index field 207 corresponds to "6."

The BS receives the uplink bandwidth request header, and then checks the value of the private CID index field 207. Accordingly, the BS can identify that it is requested to allocate bandwidth for a service flow corresponding to a sixth ranking, that is, bandwidth for the service flow #6 317, in the list, in which the includes primary management CID #0 305, the secondary management CID #1 307, and the service flows are arranged according to the rule.

Although FIG. 3 illustrates a method of determining a private CID index value by the list in which the primary management CID, the secondary management CID, and the service flows are arranged according to the rule, the private CID index value may be determined by a list in which only the plurality of service flows, except for the primary management CID and the secondary management CID, are arranged according to a rule.

FIG. 4 is a view illustrating the format of an uplink bandwidth request header in a communication system according to an exemplary embodiment of the present invention.

The uplink bandwidth request header shown in FIG. 4 is used when there is one service flow for which to request bandwidth allocation, and includes an HT field 401, an EC field 403, a Type field 405, a Sub-type field 407, a private CID index field 409, a bandwidth request field 411 and 413, a basic CID field 415 and 417, and an HCS field 419.

In an exemplary implementation, an MS requests bandwidth allocation by transmitting the uplink bandwidth request header shown in FIG. 4 to a BS. When receiving the uplink bandwidth request header, the BS checks the Sub-type field 407, the private CID index field 409, and the basic CID field 415 and 417 in the uplink bandwidth request header, and detects a service flow, bandwidth allocation for which has been requested from the MS. In this case, since the Sub-type field 407 is set to "1" (i.e. Sub-type=1), the BS can recognize that the MS has requested bandwidth allocation for one service flow. Then, the BS allocates to the MS bandwidth for the detected service flow according to bandwidth amount information recorded in the bandwidth request field 411 and 413.

The private CID index field 409 is defined to have a size of "n" bits, and the bandwidth request field 411 is defined to have a size of "12-n" bits, wherein the "n" is determined by equation 1 above. Since a method of determining a value recorded in the private CID index field 409 is the same as the method of determining a value recorded in the private CID index field 207, described above with reference to FIG. 3, a detailed description thereof will be omitted.

FIG. 5 is a view illustrating the format of an uplink bandwidth request header in a communication system according to an exemplary embodiment of the present invention.

The uplink bandwidth request header shown in FIG. 5 is used when there are a plurality of service flows for which to request bandwidth allocation, and includes an HT field 501, an EC field 503, a Type field 505, a Sub-type field 507, a Bandwidth Request (BR) CID MAP field 509, a Bandwidth Request (BR) field 511 and 513, a basic CID field 515 and 517, and an HCS field 519.

In an exemplary implementation, an MS requests bandwidth allocation by transmitting the uplink bandwidth request header shown in FIG. 5 to a BS. When receiving the uplink bandwidth request header, the BS checks the Sub-type field 507, the BR CID MAP field 509, and the basic CID field 515 and 517 in the uplink bandwidth request header, and detects service flows, bandwidth allocation for which has been requested from the MS. In this case, since the Sub-type field 507 is set to "0" (i.e. sub-type=0), the BS can recognize that the MS has requested bandwidth allocation for a plurality of service flows. Then, the BS allocates to the MS bandwidth for the detected service flows according to bandwidth request information recorded in the BR field 511 and 513. Here, the bandwidth amount information represents the total sum of the amount of bandwidth required for service flows, bandwidth allocation for which has been requested by the MS.

The bandwidth request CID MAP field 509 is defined to have a size of "n" bits, and the bandwidth request field 511 is defined to have a size of "12-n" bits, wherein the "n" is determined by equation 1 above.

Figure 6:
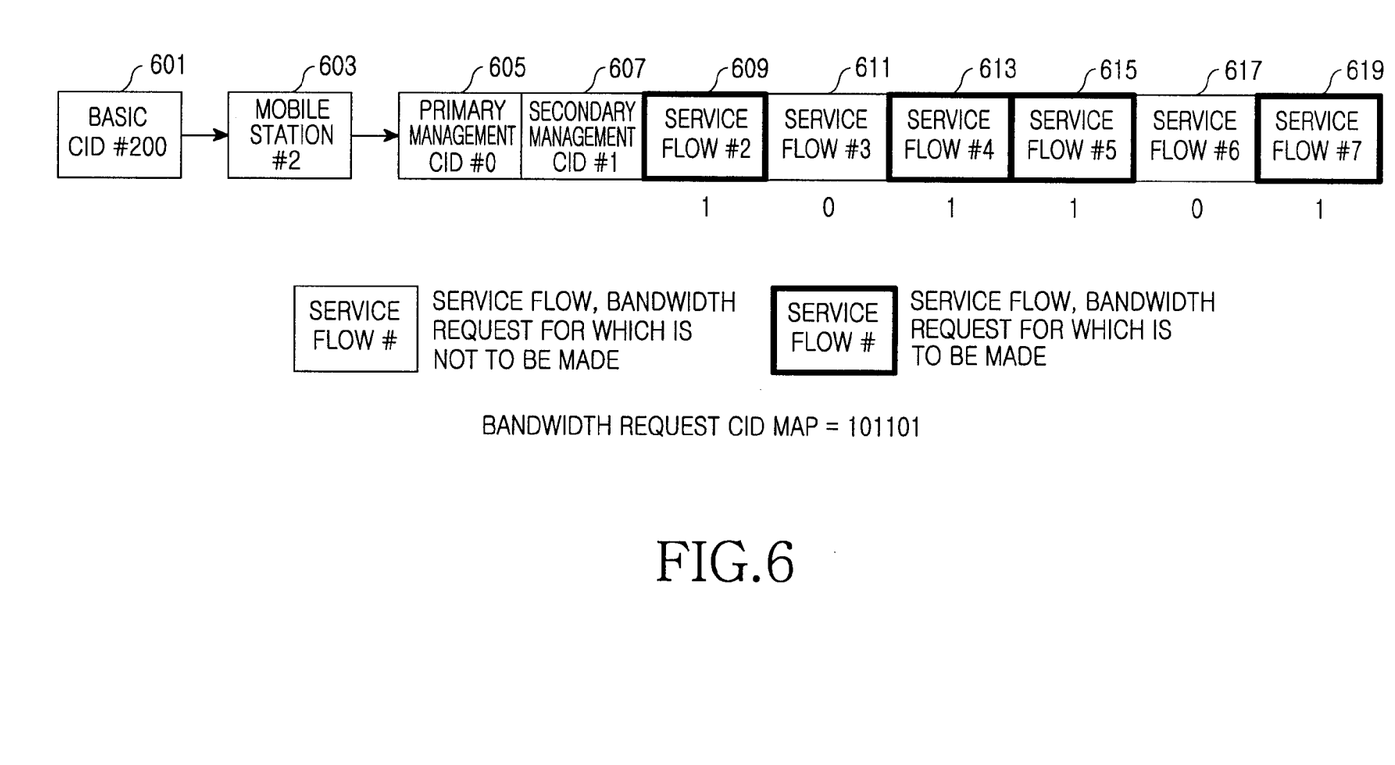
FIG. 6 is a view illustrating an operation of determining a value recorded in the bandwidth request CID MAP field according to an exemplary embodiment of the present invention.

FIG. 6 is a view illustrating an operation of determining a value recorded in the bandwidth request CID MAP field 509 according to an exemplary embodiment of the present invention.

Mobile station #2 603, corresponding to basic CID #200 601, includes primary management CID #0 605, secondary management CID #1 607, and service flow #2 609 to service flow #7 619, wherein it is assumed that different service flows are allocated different private CIDs.

When it is assumed that the MS #2 603 requests bandwidth allocation for each of service flow #2 609, service flow #4 613, service flow #5 615, and service flow #7 619 among the service flows which the MS #2 603 possesses, the MS #2 603 first sets bits corresponding to the service flows, a bandwidth allocation request for which is to be made, to "1," while setting bits corresponding to service flows, a bandwidth allocation request for which is not to be made, to "0" in a list, in which all the service flows possessed by the MS are arranged according to a rule, thereby generating a bitmap. Then, the MS #2 603 records the generated bitmap in the bandwidth request CID MAP field 509 of the uplink bandwidth request header, and transmits the uplink bandwidth request header to a BS. In this case, a bitmap value recorded in the bandwidth request CID MAP field 509 corresponds to "101101."

Accordingly, when receiving the uplink bandwidth request header, the BS can identify that it is requested to allocate bandwidth for a plurality of service flows, that is, for service flow #2 609, service flow #4 613, service flow #5 615, and service flow #7 619, corresponding to bits set to "1" in the bandwidth request CID MAP field 509.

The above description has been given about an exemplary method in which an MS requests bandwidth allocation by a combination of a basic CID and a private CID through use of the uplink bandwidth request header having the newly proposed format, and a BS allocates a bandwidth according to the request of the MS.

The following description will be given regarding a method for solving a problem that a BS cannot distinguish a private CID of each MS from the other private CIDs due to the characteristics of the private CID when the MS has transmitted a MAC header with a combination of a basic CID and the private CID according to an exemplary embodiment of the present invention. In more detail, the following description will be given about a method for receiving, by the BS, a general MAC header (hereinafter, referred to as a "generic MAC header") newly defined in exemplary embodiments of the present invention, and detecting a service flow, to which the generic MAC header and a MAC PDU concatenated with the generic MAC header belong.

First, the format of an exemplary generic MAC header will be described with reference to FIG. 7.

Figure 7:
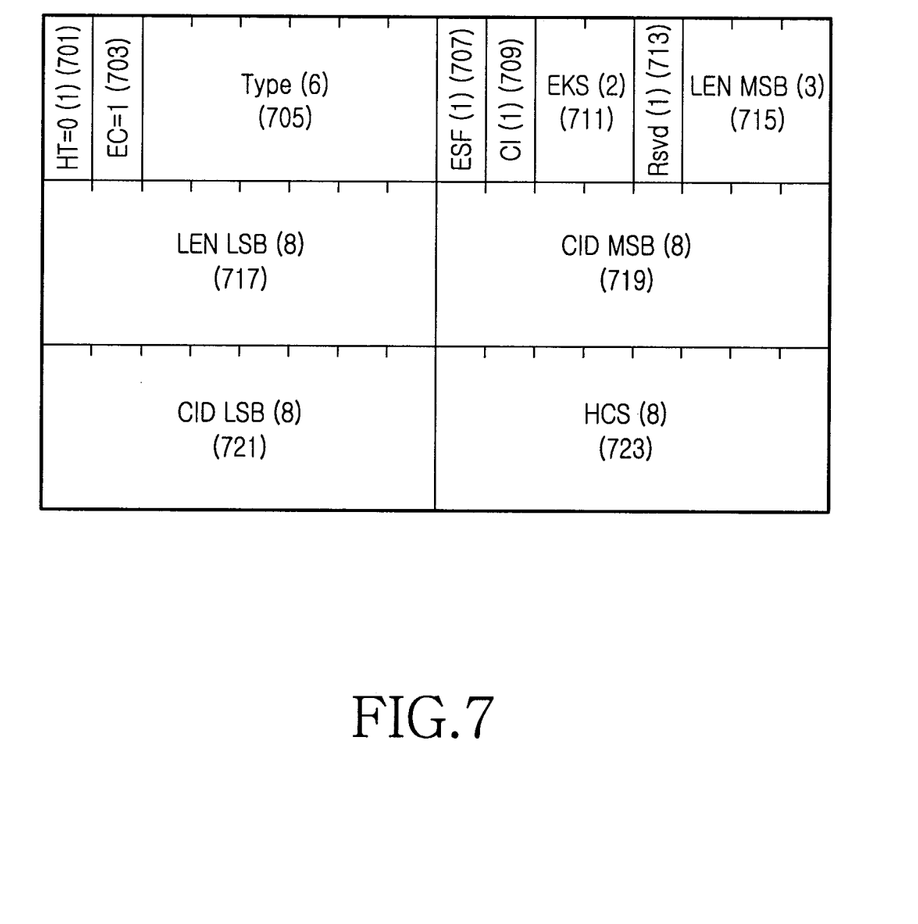
FIG. 7 is a view illustrating the format of an exemplary generic MAC header.

FIG. 7 is a view illustrating the format of a generic MAC header according to an exemplary embodiment of the present invention.

The generic MAC header includes an HT field 701, an EC field 703, a Type field 705, an Extended Subheader Field (ESF) 707 for indicating whether or not a subheader exists, a Cycle Redundancy Check (CRC) indicator field 709 for indicating a CRC error, an Encryption Key Sequence (EKS) field 711 for specifying information about a key used for payload encryption, a Reserved (Rsvd) field 713, a LENgth (LEN) field 715 and 717, a CID field 719 and 721, and an HCS field 723.

An exemplary method in which a BS receives a generic MAC header newly defined in the present invention and detects a service flow, to which a generic MAC header and a MAC PDU concatenated with the generic MAC header belong, including, for example, a method using the ESF 707 and a method using the reserved field 713.

First, an exemplary method in which a BS detects a service flow, to which a generic MAC header and a MAC PDU concatenated with the generic MAC header belong, according to the ESF 707 of the generic MAC header will now be described.

In order to enable the BS to detect a service flow, to which a generic MAC header and a MAC PDU concatenated with the generic MAC header belong, according to the ESF 707 of the generic MAC header, an MS defines a new type of extended subheader. In this case, in order to use the defined extended subheader, the bit value of the ESF 707 in the generic MAC header is set to "1." The ESF 707 is a field for indicating whether or not an extended subheader exists, as described above. When the bit value of the ESF 707 is set to "1," an MS concatenates an extended subheader proposed in exemplary embodiments of the present invention with the generic MAC header, and then transmits the generic MAC header including the extended subheader to a base station.

Figure 8:
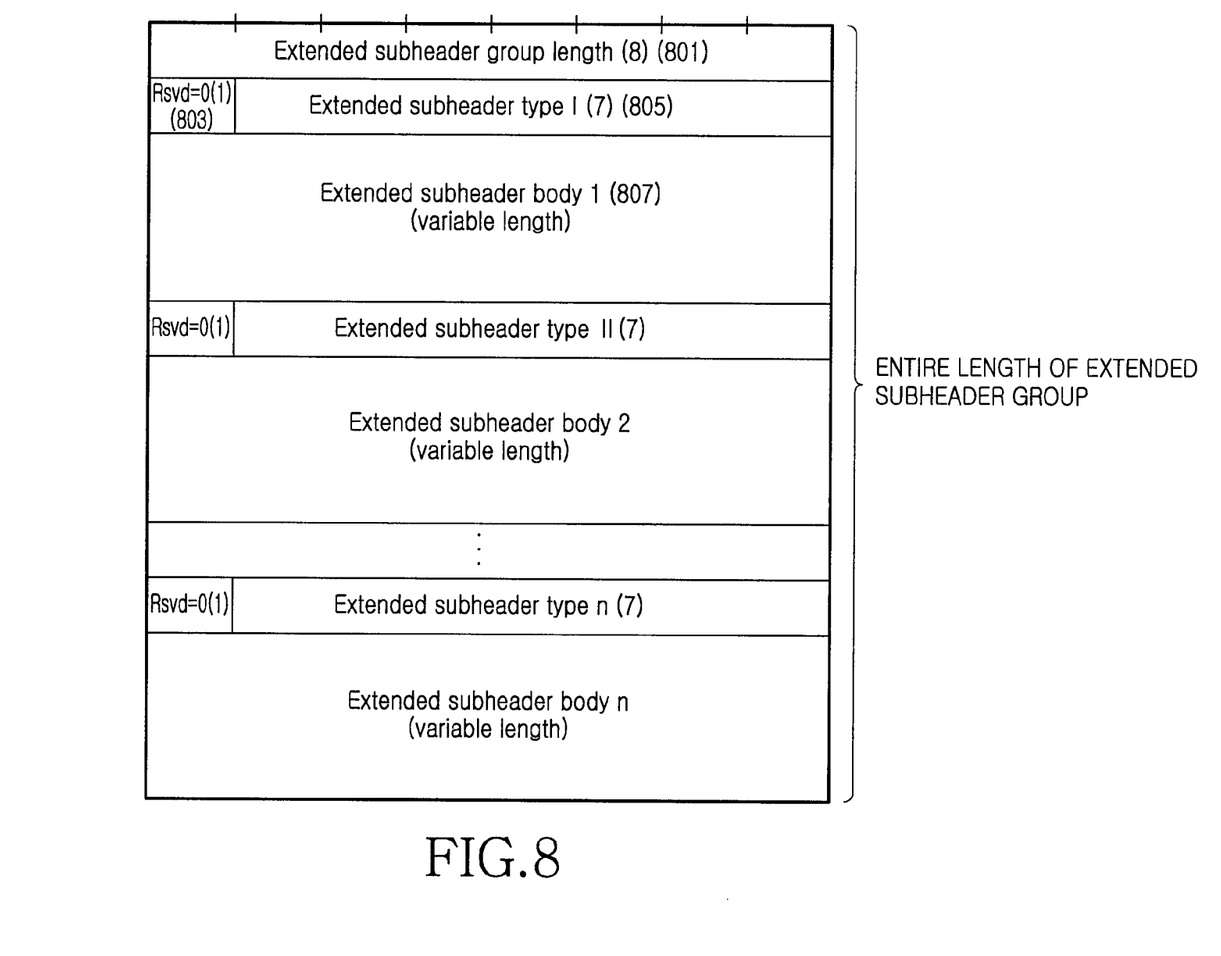
FIG. 8 is a view illustrating the format of an exemplary extended subheader group.

FIG. 8 is a view illustrating the format of an exemplary extended subheader group.

Referring to FIG. 8, the extended subheader includes an extended subheader group length field 801 for specifying information about the entire length of the extended subheader, a reserved (Rsvd) field 803, an extended subheader type-1 field 805, an extended subheader body-1 field 807, etc. Here, 128 types of the extended subheader may be defined according to the value of the extended subheader type field 805. When a new type of extended subheader is defined, a new extended subheader body corresponding to the new type of extended subheader is also defined.

That is, when an extended subheader is concatenated with a generic MAC header, and is then transmitted together with the generic MAC header, the entire length of an extended subheader group is first recorded, and then required extended subheaders are concatenated in regular sequence by making reference to Tables 1 and 2 below. In addition, the extended subheader may be distinguished according to values of the extended subheader type field 805 in uplink and downlink. First, types of extended subheader distinguished according to values of the extended subheader type field 805 in uplink are as shown in Table 1 below.

TABLE 1

| Extended subheader type | Name | Extended subchannel body size [byte] |
|---|---|---|
| 0 | SDU_SN extended subheader | 1 |
| 1 | DL sleep control extended subheader | 3 |
| 2 | Feedback request extended subheader | 3 |
| 3 | SN request extended subheader | 1 |
| 4 | PDU SN(short) extended subheader | 1 |
| 5 | PDU SN(long) extended subheader | 2 |
| 6~127 | Reserved | — |

Also, types of extended subheader distinguished according to values of the extended subheader type field 805 in downlink are as shown in Table 2 below.

TABLE 2

| Extended subheader type | Name | Extended subchannel body size [byte] |
|---|---|---|
| 0 | MIMO mode feedback extended subheader | 1 |
| 1 | UL Tx power report extended subheader | 1 |
| 2 | Mini-feedback extended subheader | 2 |
| 3 | PDU SN(short) extended subheader | 1 |
| 4 | PDU SN(long) extended subheader | 2 |
| 5~127 | Reserved | — |

As shown in the tables, according to exemplary embodiments of the present invention, a reserved region for cases where the extended subheader type field 805 has a value within a range of 6 to 127 in uplink, and a reserved region for cases where the extended subheader type field 805 has a value within a range of 5 to 127 in downlink are newly defined. Therefore, in order to enable a BS to distinguish a specific service flow, an MS concatenates the newly defined extended subheader with a generic MAC header, in which the bit value of the ESF 707 is set to "1," and then transmits the generic MAC header to the base station. Hereinafter, the format of a message obtained by concatenating the newly defined extended subheader with a generic MAC header will be described with reference to FIG. 9. In the following exemplary embodiment of the present invention, the message, in which an extended subheader is concatenated with a generic MAC header, transmitted either from an MS to a BS, or from a BS to an MS, will be defined as a first message, for convenience of description.

Figure 9:
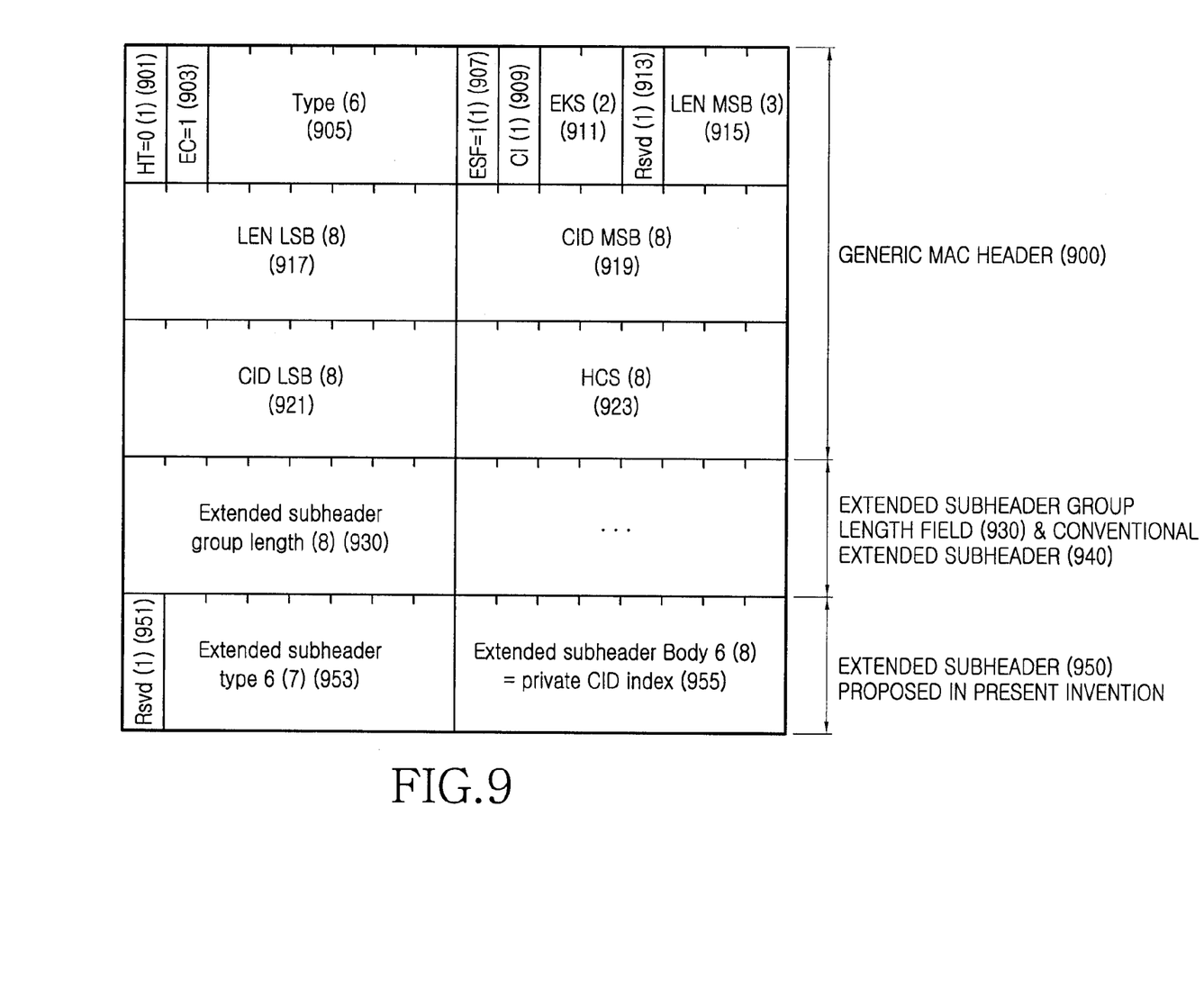
FIG. 9 is a view illustrating the format of a first message in a communication system according to an exemplary embodiment of the present invention.

FIG. 9 is a view illustrating the format of the first message in a communication system according to an exemplary embodiment of the present invention.

The first message includes a generic MAC header 900, an extended subheader group length field 930, a conventional extended subheader 940, and an extended subheader 950 proposed according to an exemplary embodiment of the present invention. The generic MAC header 900 includes an HT field 901, an EC field 903, a Type field 905, an ESF 907, a CI field 909, an EKS field 911, a reserved field 913, a LENgth field 915 and 917, a CID field 919 and 921, and an HCS field 923, wherein the bit value of the ESF 907 is set to "1."

The extended subheader 950 proposed according to an exemplary embodiment of the present invention includes a reserved field 951, an extended subheader type-6 field 953, and an extended subheader body-6 field 955, wherein a private CID index value is recorded in the extended subheader body-6 field 955, and the size of the extended subheader body-6 field 955 is defined as 8 bits. Since a method of determining a value recorded in the extended subheader body-6 field 955 is the same as the method of determining a value recorded in the private CID index field 207, described above with reference to FIG. 3, a detailed description thereof will be omitted. Although FIG. 9 shows a case where the extended subheader type field 953 has a value of "6" as an example, it is possible to use any value among the values of the extended subheader type field 953 corresponding to reserved regions in Tables 1 and 2, that is, any value within a range of 6 to 127, which are values of the extended subheader type field 953 in uplink, and a range of 5 to 127, which are values of the extended subheader type field 953 in downlink.

In an exemplary implementation, an MS transmits the first message shown in FIG. 9 to a BS, and the BS receives the first message, checks the value of the extended subheader body-6 field 955, and the CID field 919 and 921 in the first message, and detects a service flow, to which the generic MAC header and a MAC PDU concatenated with the generic MAC header belong in the MS. Also, a BS transmits the first message shown in FIG. 9 to an MS, and the MS receives the first message, checks the value of the extended subheader body-6 field 955, and the CID field 919 and 921 in the first message, and detects a service flow, to which the generic MAC header and a MAC PDU concatenated with the generic MAC header belong in the MS.

Second, an exemplary method in which a BS detects a service flow, to which the generic MAC header and a MAC PDU concatenated with the generic MAC header belong, according to the reserved field 713 of the generic MAC header, will now be described.

In order to enable the BS to detect a service flow, to which the generic MAC header and a MAC PDU concatenated with the generic MAC header belong, according to the ESF 707 of the generic MAC header, an MS defines the reserved field 713 as a private CID indicator field. When the defined private CID indicator field is set to "1," an MS concatenates a private CID indicator field proposed in exemplary embodiments of the present invention with the generic MAC header, and then transmits the generic MAC header including the private CID indicator field to a base station. That is, the MS concatenates a private CID indicator field proposed in the present invention with the generic MAC header, in which the CID indicator field is set to "1," and then transmits the generic MAC header including the private CID indicator field. Hereinafter, the format of a message obtained by concatenating a private CID indicator field proposed according to an exemplary embodiment of the present invention with a generic MAC header will be described with reference to FIG. 10. In the following exemplary embodiment of the present invention, the transmission message, in which a private CID indicator field is concatenated with a generic MAC header, will be defined as a second message, for convenience of description.

Figure 10:
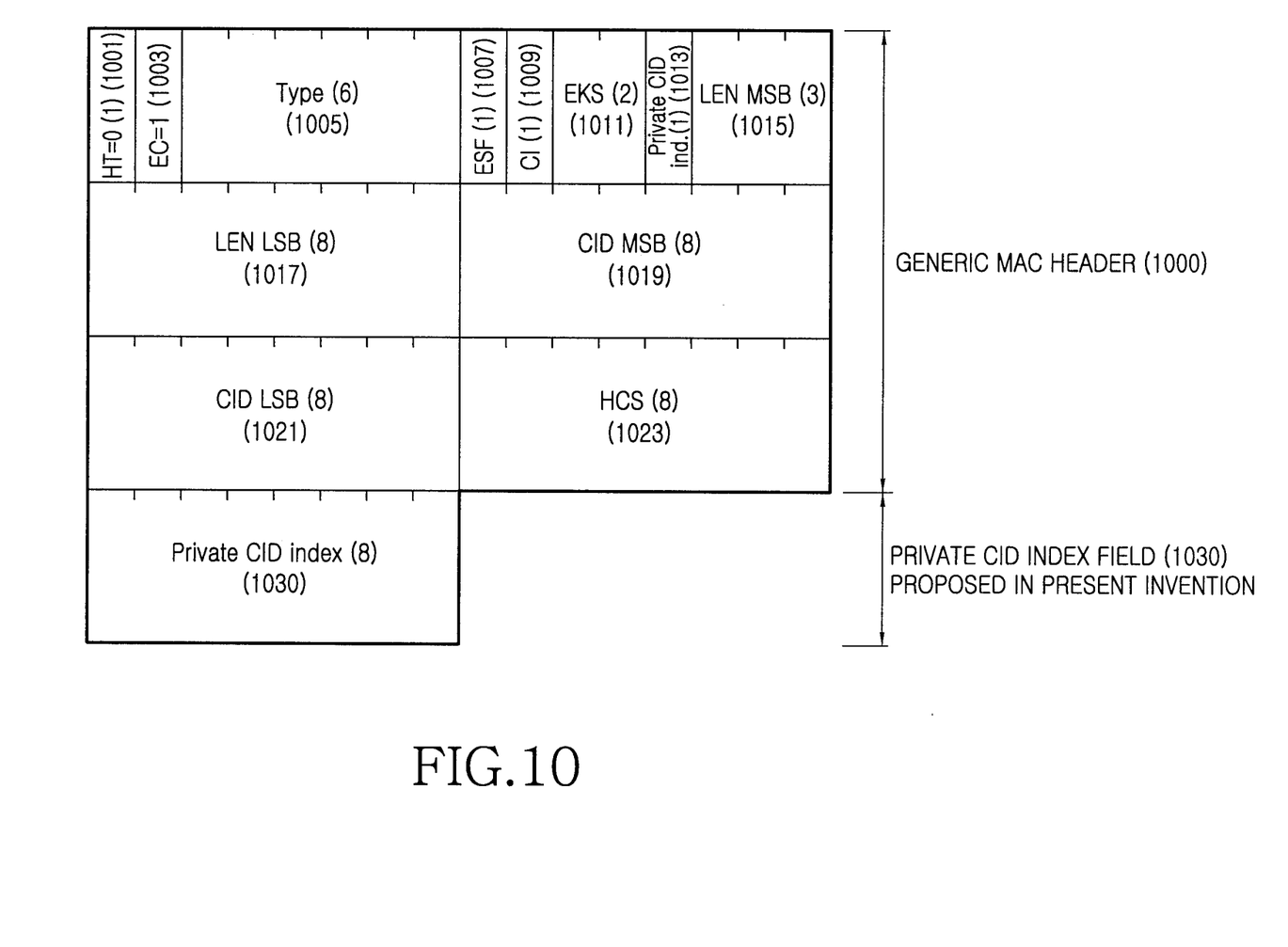
FIG. 10 is a view illustrating the format of a second message in a communication system according to an exemplary embodiment of the present invention.

FIG. 10 is a view illustrating the format of the second message in a communication system according to an exemplary embodiment of the present invention.

Referring to FIG. 10, the second message includes a generic MAC header 1000 and a private CID index field 1030 according to an exemplary embodiment of the present invention. The generic MAC header 1000 includes an HT field 1001, an EC field 1003, a Type field 1005, an ESF 1007, a CI field 1009, an EKS field 1011, a private CID indicator field 1013, a length field 1015 and 1017, a CID field 1019 and 1021, and an HCS field 1023, wherein the bit value of the private CID indicator field 1013 is set to "1."

A private CID index value, to which the generic MAC header and a MAC PDU concatenated with the generic MAC header belong, is recorded in the private CID index field 1030 proposed according to an exemplary embodiment of the present invention, and the size of the private CID index field 1030 is defined as 8 bits. Since an exemplary method of determining a value recorded in the private CID index field 1030 is the same as the method of determining a value recorded in the private CID index field 207, described above with reference to FIG. 3, a detailed description thereof will be omitted. Although FIG. 10 shows a case where the private CID index field 1030 is located at a position directly next to the generic MAC header 1000 as an example, the private CID index field 1030 may be located at any position next to the generic MAC header 1000.

That is, an MS transmits the second message shown in FIG. 10 to a BS, and the BS receives the second message, checks the value of the private CID index field 1030, and the CID field 1019 and 1021 in the second message, and detects a service flow, to which the generic MAC header and a MAC PDU concatenated with the generic MAC header belong in the MS.

Otherwise, a BS transmits the second message shown in FIG. 10 to a MS, and the MS receives the second message, checks the value of the private CID index field 1030, and the CID field 1019 and 1021 in the second message, and detects a service flow, to which the generic MAC header and a MAC PDU concatenated with the generic MAC header belong in the MS.

In the above description with reference to FIGS. 9 and 10, exemplary methods of receiving the first message or the second message and detecting a service flow associated with a private CID by a BS have been explained. However, the methods of detecting a service flow may be applied to detect any service flow using a private CID, as well as to detect a service flow associated with a private CID requesting bandwidth.

According to exemplary embodiments of the present invention, an MS requests bandwidth allocation by a combination of a basic CID and a private CID, so that it is possible to omit a CID update process generated at the time of a handover. As a result, waste of resources due to the CID update can be prevented. In addition, according to exemplary embodiments of the present invention, an MS can request bandwidth allocation for a plurality of CIDs at the same time, so that the system overhead due to bandwidth allocation requests is reduced.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for requesting bandwidth allocation by a mobile station in a communication system, the method comprising:
   detecting at least one private Connection IDentifier (CID) for which a bandwidth allocation is to be requested;
   when a number of the at least one detected private CID equals one, generating a bandwidth request header, which includes a region for indicating a basic CID for identification of the mobile station, a region for indicating a ranking of the at least one detected private CID in a list in which all private CIDs of the mobile station are arranged according to a rule, and a region for indicating information about bandwidth requested for the at least one detected private CID; and
   transmitting the bandwidth request header to a base station, wherein the basic CID is unique only to the base station and is allocated to each service flow of the base station.

2. The method of claim 1, wherein the bandwidth request header further comprises a subtype region for indicating that the number of the at least one detected private CID equals one.

3. The method of claim 1, wherein the at least one detected private CID is allocated to each service flow of the mobile station.

4. The method of claim 1, wherein the at least one detected private CID is allocated such that the mobile station is uniquely identified in the communication system.

5. The method of claim 1, wherein a size of the region for indicating the ranking is determined by an equation, $$n=\min(M,m),$$

in which "M" represents a value determined according to a minimum size of the region for indicating the information about bandwidth, "m" represents a minimum value from among integers which satisfy a condition that "$2^m \geq k$," and "k" represents a total number of private CIDs possessed by the mobile station corresponding to the basic CID.

6. A method for requesting bandwidth allocation by a mobile station in a communication system, the method comprising:
   detecting at least one private Connection IDentifier (CID) for which a bandwidth allocation is to be requested;
   when the at least one detected private CID is plural in number, generating a bandwidth request header, which includes a subtype region for indicating that the at least one detected private CID is plural in number, a region for indicating a basic CID for identification of the mobile station, a region for indicating a bitmap that represents the at least one detected private CID that is plural in number in a list in which all private CIDs of the mobile station are arranged according to a rule, and a region for indicating information about bandwidth requested for the at least one detected private CID that is plural in number; and
   transmitting the bandwidth request header to a base station, wherein the basic CID is unique only to the base station and is allocated to each service flow of the base station.

7. The method of claim 6, further comprising, when the at least one detected private CID is one in number, generating a bandwidth request header, which includes a subtype region for indicating that the at least one detected private CID is one in number, a region for indicating a basic CID for identification of the mobile station, a region for indicating recording a ranking of the at least one detected private CID in a list in which all private CIDs of the mobile station are arranged according to a rule, and a region for indicating information about bandwidth requested for the at least one detected private CID.

8. The method of claim 7, wherein a size of the region for indicating the ranking is determined by an equation, $$n=\min(M,m),$$

in which "M" represents a value determined according to a minimum size of the region for indicating the information about bandwidth, "m" represents a minimum value among integers which satisfy a condition that "$2^m \geq k$," and "k" represents a total number of private CIDs possessed by the mobile station corresponding to the basic CID.

9. The method of claim 6, wherein the at least one detected private CID that is plural in number are allocated to each service flow of the mobile station.

10. The method of claim 6, wherein the at least one detected private CID that is plural in number are allocated such that the mobile station is uniquely identified in the communication system.

11. The method of claim 6, wherein a size of the region for recording the bitmap is determined by an equation, $$n=\min(M,m),$$

in which "M" represents a value determined according to a minimum size of the region for indicating the information about bandwidth, "m" represents a minimum value form among integers which satisfy a condition that "$2^m \geq k$," and "k" represents a total number of private CIDs possessed by the mobile station corresponding to the basic CID.

12. A method for detecting a service flow, to which a Media Access Control (MAC) header and a MAC Protocol Data Unit (MAC PDU) concatenated with the MAC header belong, in a communication system, the method comprising:
   receiving a message, which includes a MAC header, an extended subheader group length field, an extended subheader type field, and an extended subheader body field corresponding to the extended subheader type field and indicating a private Connection IDentifier (CID) index; and
   detecting a service flow, to which the MAC header and a MAC PDU concatenated with the MAC header belong, according to the private CID index indicated in the extended subheader body field of the message,
   wherein the MAC header comprises a type field, a Bandwidth Request field and a basic CID field,
   wherein the basic CID is unique only to a base station and is allocated to each service flow of the base station, and wherein a private CID indicated by the private CID index is allocated such that a mobile station is uniquely identified in the communication system.

13. A method for detecting a service flow, to which a Media Access Control (MAC) header and a MAC Protocol Data Unit (MAC PDU) concatenated with the MAC header belong, in a communication system, the method comprising:

receiving a message, which includes a MAC header and a private Connection IDentifier (CID) field indicating a private CID index, to which the MAC header and the MAC PDU concatenated with the MAC header belong, is indicated; and detecting a service flow, to which the MAC header and the MAC PDU concatenated with the MAC header belong, according to the private CID index indicated in the private CID field of the message, wherein the MAC header comprises a type field, a Bandwidth Request field and a basic CID field, wherein the basic CID is unique only to a base station and is allocated to each service flow of the base station, and wherein a private CID indicated by the private CID index is allocated such that a mobile station is uniquely identified in the communication system.

* * * * *